(12) United States Patent
Tou

(10) Patent No.: US 7,923,889 B2
(45) Date of Patent: Apr. 12, 2011

(54) ROTOR OF AN ELECTRIC MOTOR AND METHOD OF MANUFACTURING THE SAME

(75) Inventor: Ryuuji Tou, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/937,903

(22) PCT Filed: Apr. 15, 2009

(86) PCT No.: PCT/IB2009/005417
§ 371 (c)(1),
(2), (4) Date: Nov. 4, 2010

(87) PCT Pub. No.: WO2009/127967
PCT Pub. Date: Oct. 22, 2009

(65) Prior Publication Data
US 2011/0037340 A1    Feb. 17, 2011

(30) Foreign Application Priority Data
Apr. 15, 2008    (JP) .................................. 2008-105486

(51) Int. Cl.
*H02K 1/30* (2006.01)
(52) U.S. Cl. ........................... 310/216.121; 310/216.116

(58) Field of Classification Search ........... 310/216.113, 310/216.116, 216.121, 216.122, 216.124; 29/598
See application file for complete search history.

(56) References Cited

U.S. PATENT DOCUMENTS

| | | | | |
|---|---|---|---|---|
| 4,843,705 A | * | 7/1989 | Aussieker et al. | ............... 29/598 |
| 5,965,966 A | * | 10/1999 | Aiello et al. | ................... 310/232 |
| 7,743,484 B2 | * | 6/2010 | Fukumaru et al. | ............... 29/598 |

FOREIGN PATENT DOCUMENTS

| | | |
|---|---|---|
| DE | 10 2006 037804 A1 | 3/2007 |
| EP | 2 154 767 A2 | 2/2010 |
| JP | 2004-032958 A | 1/2004 |
| JP | 2005-168074 A | 6/2005 |
| JP | 2007-166862 A | 6/2007 |
| WO | 99/14839 A1 | 3/1999 |

* cited by examiner

*Primary Examiner* — Dang D Le
(74) *Attorney, Agent, or Firm* — Kenyon & Kenyon LLP (57) ABSTRACT

In a manufacturing method of a rotor for an electric motor including: a core (4) formed of stacked steel plates, each of which has a center hole (4a); and a shaft (3) inserted through the center hole (4a) of the core (4), the shaft (3) is deformed to fit a second end plate (2) in a state where the second end plate (2) is pressed against the core (4), and a deformed portion (3e) of the shaft (3) that engages with an edge (2a, 2b) of the second end plate (2) is deformed along a core-side edge portion (2a) and a no core-side edge portion (2b) of the edge (2a, 2b) of the second end plate (2) so that the deformed portion (3e) is deformed into the deformed shape that fits the shape of the edge (2a, 2b) of the second end plate (2).

4 Claims, 11 Drawing Sheets

RELATED ART

FIG. 11

RELATED ART

FIG. 12

RELATED ART

ROTOR OF AN ELECTRIC MOTOR AND METHOD OF MANUFACTURING THE SAME

This is a 371 national phase application of PCT/IB2009/005417 filed 15 Apr. 2009, claiming priority to Japanese Patent Application No. 2008-105486 filed 15 Apr. 2008, the contents of which are incorporated herein by reference.

BACKGROUND OF THE INVENTION

1. Field of the Invention

The invention relates to a manufacturing method of a rotor for an electric motor and a rotor for an electric motor that includes a core formed of stacked steel plates interposed between a first end plate, which is disposed on a lower side of the core, and a second end plate, which is disposed on an upper side of the core.

2. Description of the Related Art

Japanese Patent Application Publication No. 2004-32958 (JP-A-2004-32958) describes a structure of a rotor for an electric motor as a related art in which a core formed of stacked steel plates is pressed by end plates from both sides of the core in the stacking direction of the steel plates. The applicant has used the invention shown in FIG. 10, which shows the configuration of the rotor of the related art in which the core formed of the stacked steel plates is pressed by the end plates from the both sides in the stacking direction. A shaft 53 includes an inner shaft 53a and an outer shaft 53b formed on a bottom 53c. A flange portion 53d is formed on an outer periphery of the bottom 53c. A first end plate 55 and a core 54 are stacked on the flange portion 53d in the axial direction of the shaft 53. The core 54 includes a plurality of steel plates that are identically formed and stacked. The first end plate 55 and the core 54 are fitted onto the outer shaft 53b by inserting the outer shaft 53b through a center hole 55a of the first end plate 55 and through a center hole 54a of the core 54. A second end plate 52 is placed on and pressed against the core 54 at a pressure A so as to make the first end plate 55 closely contact the core 54, and also make the stacked steel plates of the core 54 closely contact each other. While the pressure A is applied to the second end plate 52, a pressure B is applied to a deformation punch 51 to deform a deformed portion 53e of the shaft 53, whereby the deformed portion 53e is deformed to fit a no core-side edge portion 52b of an inner edge of the second end plate 52 (this process will be hereinafter referred to as "deformation process"). The deformed portion 53e is thus deformed to fit the no core-side portion 52b of the inner edge of the second end plate 52, whereby the first end plate 55, the core 54, and the second end plate 52 are caused to closely contact each other.

Figure 10:
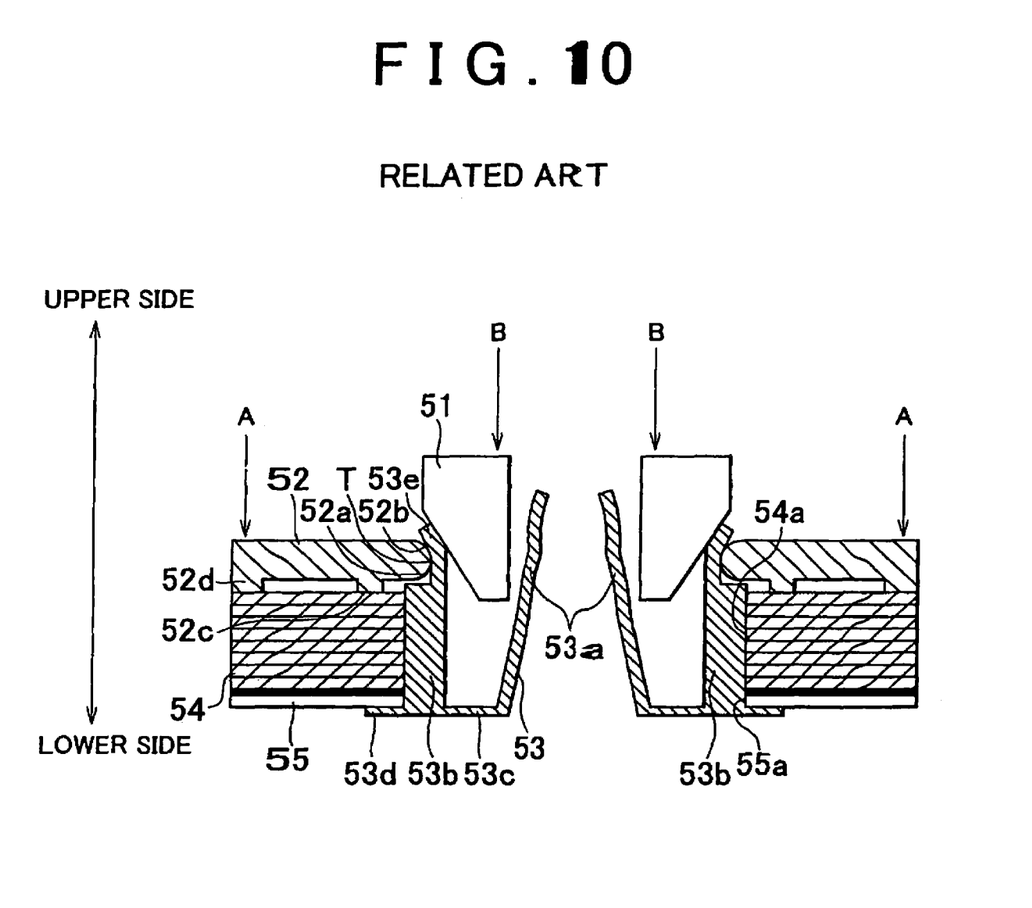
FIG. 10 is a longitudinal cross-section showing a related art in which a core, which is formed of a plurality of steel plates stacked, is pressed by a second end plate.
Figure 12:
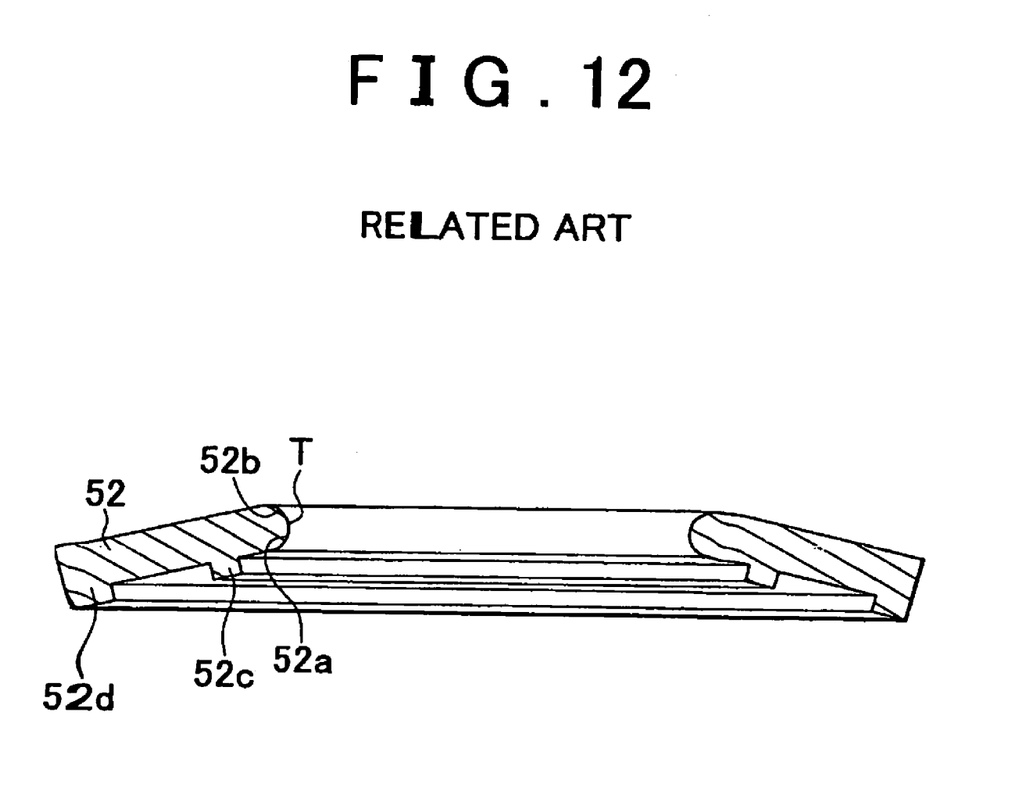
FIG. 12 is a longitudinal cross-section showing the second end plate according to the related art.

However, the invention described in FIG. 10 adopts a configuration in which an inner portion 52c of the second end plate 52 is raised, compared to the position of an outer edge 52d, so that the inner edge of the second end plate 52 is easily deformed in an elastic manner when the deformed portion 53e is deformed to fit the no core-side edge portion 52b of the inner edge of the second end plate 52. FIG. 12 emphatically shows the feature of the actual configuration of the second end plate 52. The second end plate 52 is substantially inverted saucer shaped. More specifically, if the second end plate 52 is a flat plate, when the entire surface of the core 54 is pressed by the second end plate 52, a force is concentrated on the inner portion 52c of the second end plate 52, and the outer edge 52d of the second end plate 52 is lifted, and as a result, a gap is created between the outer edge 52d of the second end plate 52 and the core 54. Therefore, the configuration of the second end plate 52 has to be substantially inverted saucer shaped as shown in FIG. 12.

Figure 11:
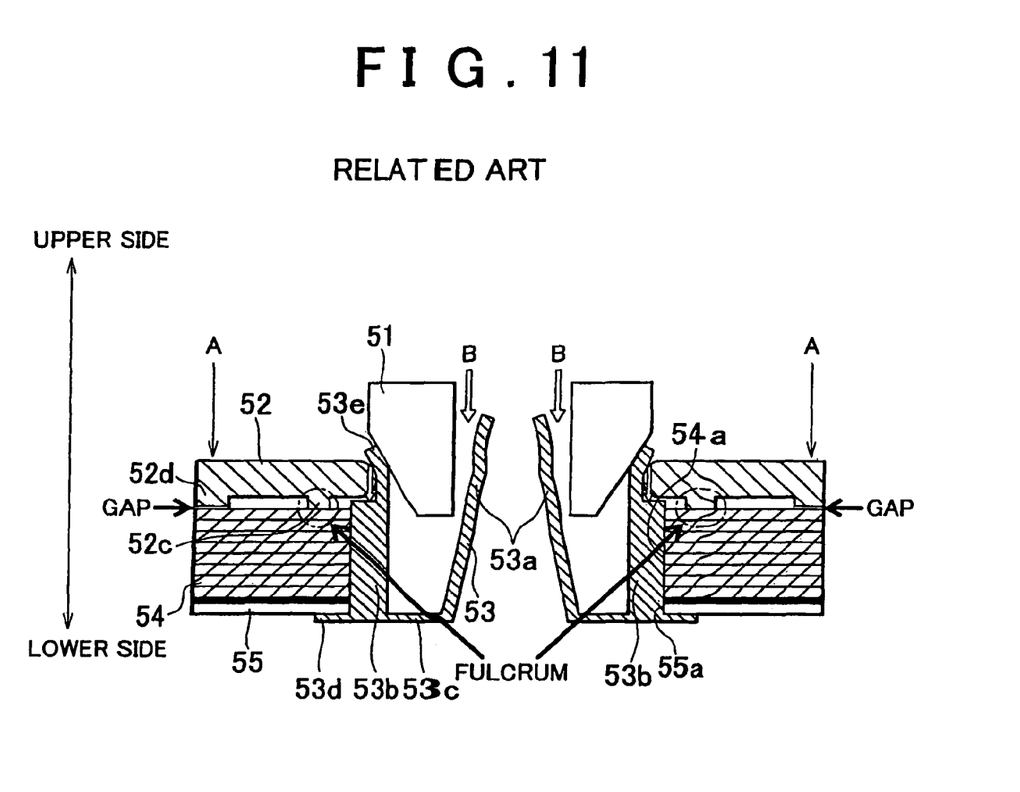
FIG. 11 is a longitudinal cross-section showing a state of the second end plate when the core formed of the stacked steel plates is pressed by the second end plate, according to the related art.

Because the process, in which the deformed portion 53e is pressed at the pressure B, involves the plastic deformation, the pressure B is four to five times higher than the pressure A at which the second end plate 52 is pressed. Therefore, even if the second end plate 52 is substantially inverted saucer shaped, because the high pressure B is applied to the inner portion 52c of the second end plate 52 through the deformed portion 53e as shown in FIG. 11, there is still a possibility that the inner portion 52c serves as a fulcrum and the outer edge 52d of the second end plate 52 is lifted, which results in a gap created between the outer edge 52d of the second end plate 52 and the core 54.

If there is a gap between the outer edge 52d of the second end plate 52 and the core 54, it is not possible to firmly press outer edges of the stacked steel plates of the core 54. If this occurs, a gap is created between the adjacent steel plates, so that magnetic resistance of the core 54 is increased, and lines of magnetic force generated are reduced. This reduces torque of the electric motor rotor. Further, if there is a gap between the outer edge 52d of the second end plat 52 and the core 54, it is not possible to firmly press the steel plates of the core 54, and the stacked steel plates therefore vibrate, resulting in unnecessary load to the electric motor rotor. This also reduces the torque of the electric motor rotor. Further, if the second end plate 52 is pressed excessively strongly from the no core-side edge portion 52b, magnets in the core 54 may be broken, and therefore, it is not appropriate to strongly press the second end plate 52 from the no core-side edge portion 52b.

SUMMARY OF THE INVENTION

The invention provides a manufacturing method of a rotor for an electric motor, and a rotor for an electric motor, with which it is possible to prevent an outer edge of the second end plate from being lifted and firmly fasten stacked steel plates.

A first aspect of the invention relates to a manufacturing method of a rotor for an electric motor including a core formed of stacked steel plates, each of which has a center hole, and a shaft inserted through the center hole of the core. In the manufacturing method, the shaft is deformed to fit an end plate in a state where the end plate is pressed against the core. The manufacturing method includes deforming a deformed portion of the shaft that engages with an edge of the end plate, along a core-side edge portion and a no core-side edge portion of the edge of the end plate with respect to the thickness direction of the edge of the end plate.

Further, in the manufacturing method according to the first aspect of the invention, the deformed portion may be in the same shape as a shape of the edge of the end plate.

With the manufacturing method according to the first aspect of the invention, it is possible to manufacture the rotor for an electric motor in which the deformed portion is formed into the same shape as that of the edge of the end plate, by deforming the deformed portion of the shaft that engages with the edge of the end plate, along the core-side edge portion and the no core-side edge portion with respect to the thickness direction of the edge of the end plate. When the rotor for an electric motor is manufactured using the manufacturing method according to the first aspect, it is possible to cancel a pressing force applied to the deformed portion on the no core-side edge portion-side by deforming the deformed portion to fit the core-side edge portion, as well as the no core-side edge portion. Canceling the pressing force applied on the no core-side edge portion-side suppresses concentration of a load on an inner portion of the core, which is applied on the no core-side edge portion-side of the end plate. This makes it possible to prevent the outer edge of the end plate from being lifted. As a result, it is possible to suppress creation of a gap between the outer edge of the end plate and the core, thereby suppressing reduction of torque of the rotor for an electric motor. Further, because the deformed portion is deformed to fit the core-side edge portion of the edge of the end plate, as well as the no core-side edge portion, it is possible to suppress excessive pressing of the end plate against the core on the no core-side edge portion-side, thereby suppressing breakage of the magnets in the core.

Further, in the manufacturing method according to the first aspect, the deformed portion of the shaft may be deformed by a deforming device, which includes a portion formed along the shape of the edge of the end plate.

Further, in the manufacturing method according to the first aspect, the deforming device may be a mandrel, and the deformed portion of the shaft may be deformed by moving the mandrel in a circumferential direction relative to the shaft while moving the mandrel away from the axis of the shaft.

With the manufacturing method according to the first aspect, the mandrel that includes a portion formed along the shape of the edge of the end plate is moved in the circumferential direction relative to the shaft so as to move away from the axis of the shaft. This makes it possible to uniformly deform the entire circumference of the deformed portion so as to fit the end plate, and further, to reliably and firmly deform the deformed portion so as to fit the end plate.

Further, in the manufacturing method according to the first aspect, the deforming device that includes a first deforming structure for deforming the deformed portion so as to fit the core-side edge portion of the edge of the end plate, which is a portion of the edge on a core side with respect to an innermost position of the edge, and a second deforming structure for deforming the deformed portion to fit the no core-side edge portion of the end plate, which is a portion on a side opposite to the core side with respect to the innermost position of the edge, may be used. Further, the deforming may include deforming the core-side edge portion with respect to the thickness direction of the edge of the end plate by the first deforming structure and deforming the no core-side edge portion with respect to the thickness direction of the edge of the end plate by the second deforming structure while the first deforming structure is positioned at a deformation position.

With the manufacturing method according to the first aspect, it is possible to simplify the manufacturing apparatus of the rotor for an electric motor. This makes it possible to manufacture the rotor for an electric motor at lower costs.

Further, in the manufacturing method according to the first aspect, the end plate may include a first end plate and a second end plate so that the core is pressed by the first end plate and the second end plate from both sides in a stacking direction of the steel plates, and the shaft may be provided with the deformed portion at a position that corresponds to one of the first end plate and the second end plate.

A rotor for an electric motor according to a second aspect of the invention includes a core formed of stacked steel plates, each of which includes a center hole, and a shaft inserted into the center hole. In the rotor, the shaft is deformed to fit an end plate in a state where the end plate is pressed against the core. In the rotor, a deformed portion of the shaft that engages with an edge of the end plate is deformed along a core-side edge portion and a no core-side edge portion of the edge with respect to the thickness direction of the edge of the end plate.

Further, in the rotor for an electric motor according to the second aspect, the deformed portion of the shaft may be in the same shape as a shape of the edge of the end plate.

With the rotor according to the second aspect of the invention, it is possible to cancel a pressing force applied to the deformed portion on the no core-side edge portion-side of the end plate by deforming the deformed portion to fit the core-side edge portion, as well as the no core-side edge portion. Canceling the pressing force applied on the no core-side edge portion-side of the end plate suppresses concentration of a load, which is applied on the no core-side edge portion-side of the end plate, on an inner portion of the core. This makes it possible to prevent the outer edge of the end plate from being lifted. As a result, it is possible to suppress creation of a gap between the outer edge of the end plate and the core, thereby suppressing reduction of torque of the rotor for an electric motor. Further, the deformed portion is deformed to fit the core-side edge portion of the edge of the end plate, as well as the no core-side edge portion, it is possible to suppress excessive pressing of the end plate against the core on the no core-side edge portion-side, thereby suppressing breakage of the magnets in the core. This makes it possible to cause the rotor for an electric rotor to generate a magnetic force in a normal condition.

BRIEF DESCRIPTION OF THE DRAWINGS

The features, advantages, and technical and industrial significance of this invention will be described in the following detailed description of embodiments of the invention with reference to the accompanying drawings, in which like numerals denote like elements, and wherein.

DETAILED DESCRIPTION OF EMBODIMENTS

Figure 1:
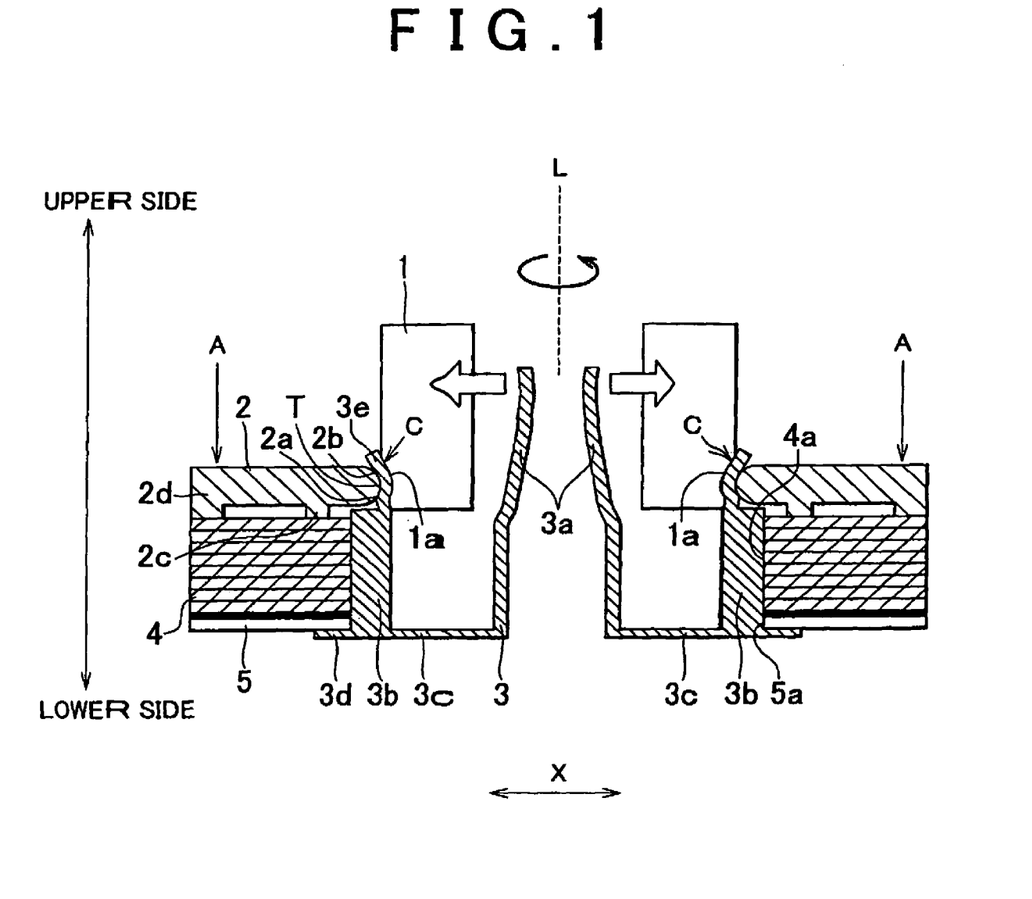
FIG. 1 is a longitudinal cross-section showing a second process of a first embodiment of the invention.
Figure 2:
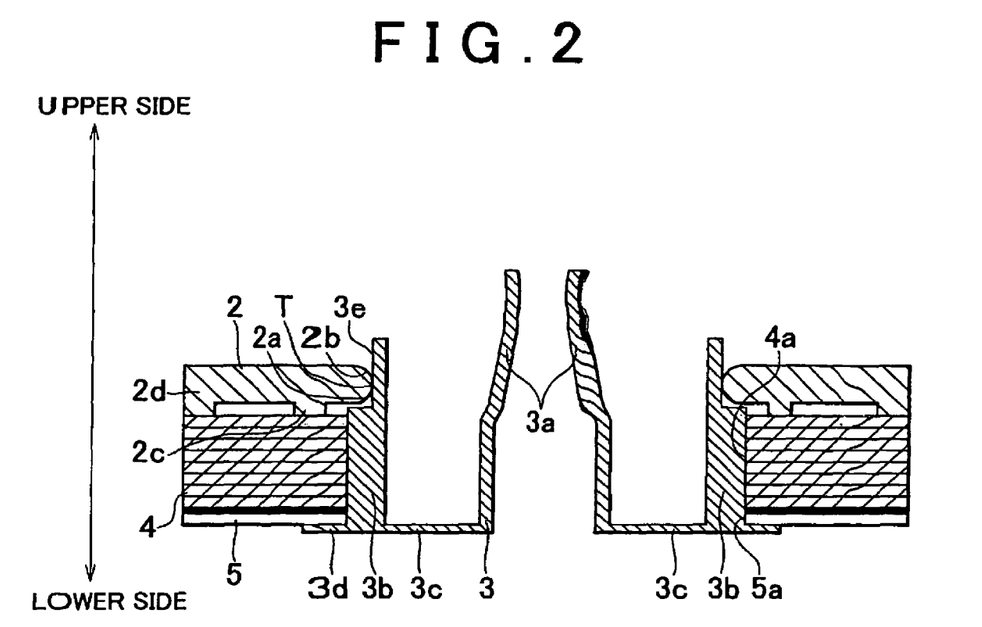
FIG. 2 is a longitudinal cross-section showing the configuration of a rotor according to the first embodiment of the invention.
Figure 5:
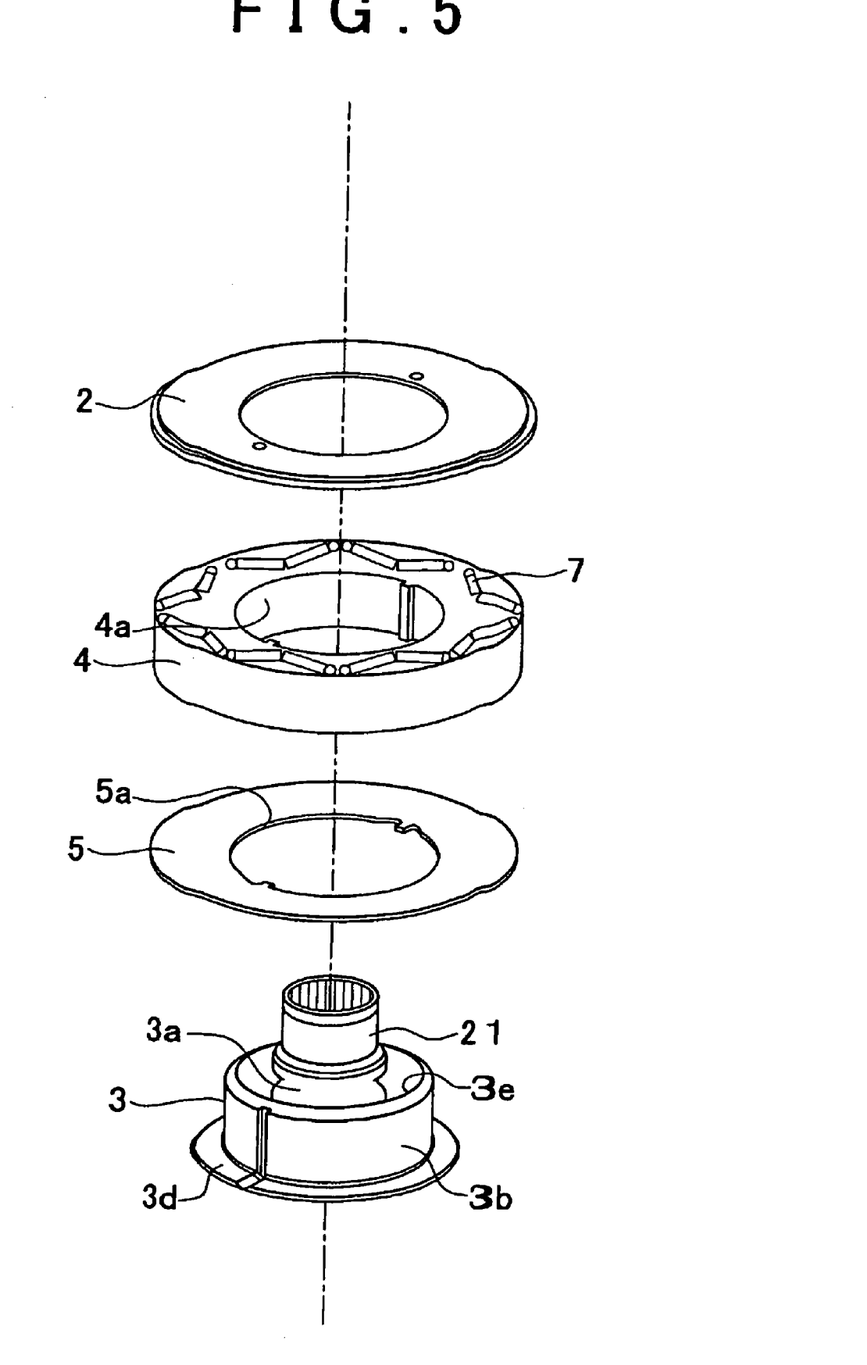
FIG. 5 is an exploded perspective view showing components of the rotor according to the first embodiment of the invention.

An embodiment of specific processes in a manufacturing method of a rotor for an electric motor (hereinafter referred to as "electric motor rotor") according to the invention will be hereinafter described in detail with reference to the attached drawings. FIG. 1 shows an apparatus for manufacturing the electric motor rotor by which a deformed portion 3e is shaped to fit the shape of an inner edge of a second end plate 2, which includes a core-side edge portion 2a and a no core-side edge portion 2b. FIG. 2 is a cross-sectional view showing the configuration of the electric motor rotor. FIG. 5 is an exploded perspective view showing components of the electric motor rotor. The components of the electric motor rotor will be described with reference to FIGS. 2 and 5. A shaft 3 includes an inner shaft portion 3a and an outer shaft portion 3b, which are cylindrically shaped and formed on a bottom 3c of the shaft 3. A flange portion 3d is formed on an outer peripheral portion of the bottom 3c. A first end plate 5 is donut-shaped with a center hole 5a, and a core 4 is formed by stacking a plurality of donut-shaped steel plates, each having a center hole 4a. The first end plate 5 and the core 4 are stacked on the flange portion 3d in an axial direction of the shaft 3. Magnets 7 are inserted into the core 4. The shaft 3 is inserted through the center hole 5a of the first end plate 5 and the center hole 4a of the core 4 so that the first end plate 5 and the core 4 are fitted onto the outer shaft portion 3b. The second end plate 2, which is donut-shaped with a center hole, is placed on the core 4 so as to press the first end plate 5 and the core 4. The second end plate 2 is a flat plate.

Figure 3:
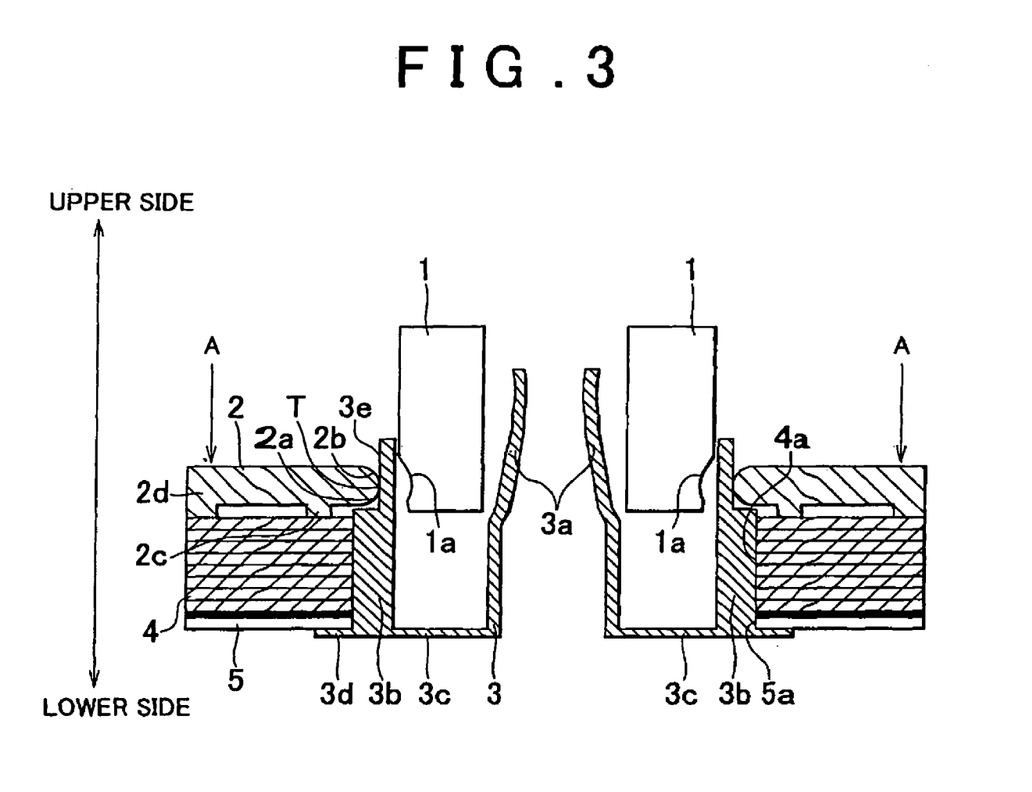
FIG. 3 is a longitudinal cross-section showing a first process of the first embodiment of the invention.
Figure 4:
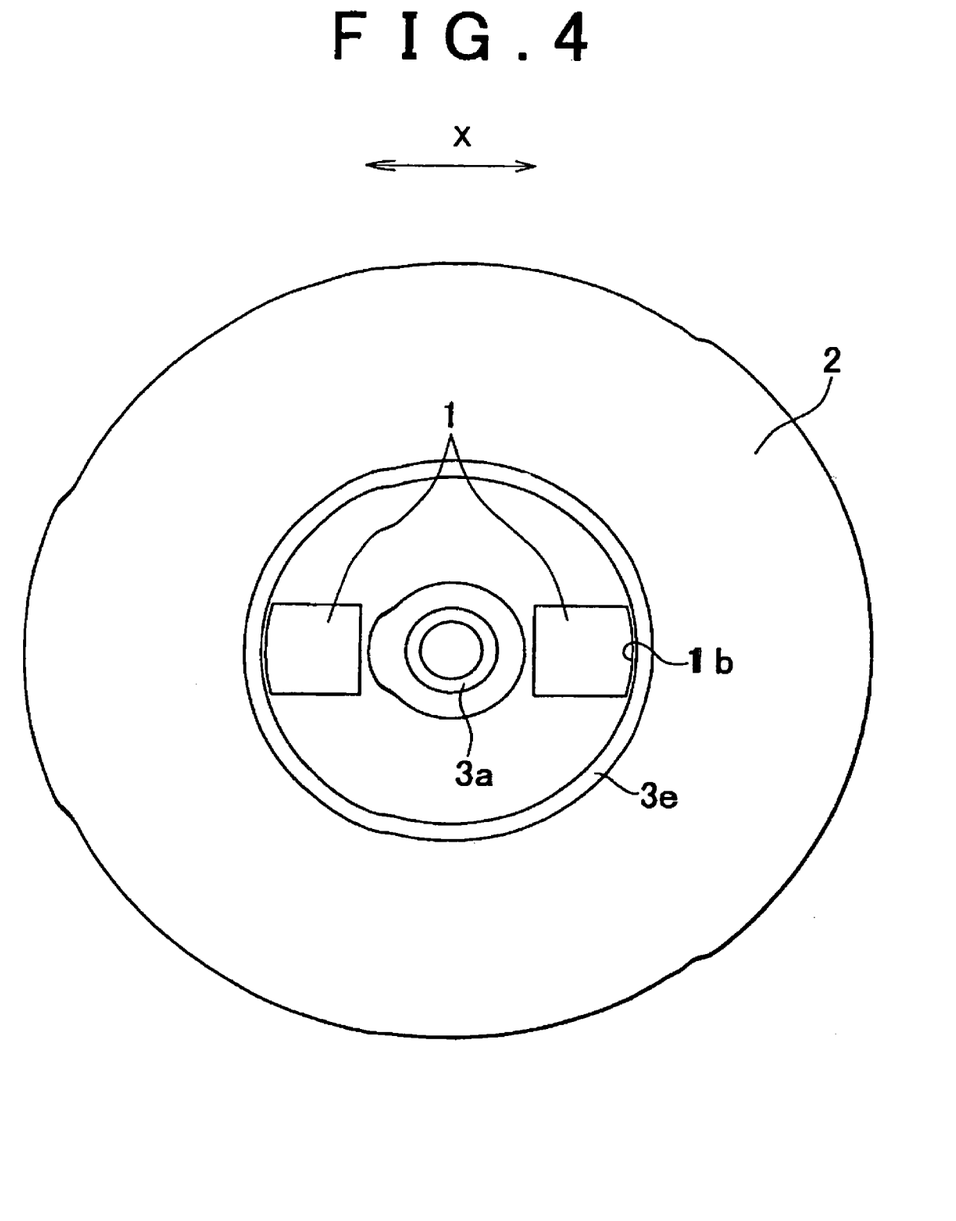
FIG. 4 is a plan view showing the first process in the first embodiment of the invention.

The manufacturing method according to the first embodiment includes a first process and a second process. FIG. 3 is a longitudinal cross-section of the apparatus for manufacturing the electric motor rotor according to the first embodiment, and FIG. 4 is a plan view showing the apparatus for manufacturing the electric motor rotor according to the first embodiment as shown in FIG. 3. The first process will be described with reference to FIGS. 3 and 4. Before deforming the deformed portion 3e, a pair of mandrels 1 are inserted between the outer shaft portion 3b and the inner shaft portion 3a of the shaft 3 in the axial direction of the shaft 3 by elevating means (not shown) in a manner such that the mandrels 1 do not contact the outer shaft portion 3b and the inner shaft portion 3a. As shown in FIG. 4, the mandrels 1 are held by diameter increasing means (not shown) so as to be movable in a radial direction X. Further, the mandrels 1 are held by elevating means (not shown) so as to be movable in a vertical direction relative to the shaft 3. When viewed from above, an outer periphery 1b of each of the mandrels 1 has a shape with the same curvature as the curvature of an inner peripheral surface of the deformed portion 3e. Because the mandrels 1 have the same curvature as that of the inner peripheral surface of the deformed portion 3e, it is possible to deform the deformed portion 3e for fitting, along the inner peripheral surface of the deformed portion 3e when the distance between the mandrels 1 is increased. As shown in FIG. 3, when the mandrels 1 are viewed in a longitudinal cross-section, a processing portion 1a of each of the mandrels 1 (hereinafter referred to as "mandrel processing portion 1a") is formed in a lower portion of an outer peripheral surface of the mandrel 1 in a manner such that the mandrel processing portion 1a has the same curvature as the curvature of the inner edge of the second end plate 2. The vertical level of each of the mandrels 1 is set so that the vertical level of the mandrel processing portion 1a is equal to the vertical level of the inner edge of the second end plate 2, so as to be able to deform the deformed portion 3e for fitting, along the inner peripheral surface of the deformed portion 3e when the distance between the mandrels 1 is increased.

FIG. 1 shows the second process of the first embodiment. The mandrels 1 are inserted between the outer shaft portion 3b and the inner shaft portion 3a, and the diameter increasing means moves the mandrels 1 in the radial direction X to increase the distance between the mandrels 1 while rotating the mandrels 1 about the rotation axis L. The mandrels 1 rotate while gradually increasing the distance between the mandrels 1. As the distance between the mandrels 1 increases, the mandrel processing portion 1a of each of the mandrels 1 is brought into contact with the deformed portion 3e provided in the upper portion of the outer shaft portion 3b. When the distance between the mandrels 1 is further increased after the mandrels 1 contact the deformed portion 3e while rotating the mandrels 1 with the use of the diameter increasing means, the deformed portion 3e is caught between the mandrel processing portions 1a and the inner edge of the second end plate 2, and the deformed portion 3e is gradually shaped to fit the shape of the inner edge of the second end plate 2. Therefore, it is possible to suppress inner distortion and residual stress of the deformed portion 3e by gradually deforming the deformed portion 3e, whereby the magnets 7 are made less prone to damage. Further, this makes it possible to improve durability of the electric motor rotor. It takes approximately one minute to finish the deformation process, and the mandrels 1 make one and a half revolutions per minute.

After the deformed portion 3e is deformed to fit the inner edge of the second end plate 2 by the mandrels 1, the mandrels 1 are moved by the diameter increasing means in an opposite direction to the radial direction X back to the state shown in FIG. 3. Then, the mandrels 1 are pulled up by the elevating means from inside the shaft 3, thereby finishing the deformation process for the electric motor rotor.

As described above, in the manufacturing method of the electric motor rotor in which the shaft 3 is inserted through the center hole 4a of the core 4 formed of the stacked steel plates, each having the center hole 4a, and the deformed portion 3e of the shaft 3 is deformed to fit the second end plate while the second end plate 2 is pressed against the core 4, the electric motor rotor is manufactured by deforming, on the core-side edge portion 2a-side and the no core-side portion 2b-side of the second end plate 2, the deformed portion 3e of the shaft 3 that engages with the inner edge of the second end plate 2, and deforming the deformed portion 3e into the deformed shape that fits the shape of the inner edge of the second end plate 2. Because the deformed portion 3e is deformed to fit the inner edge of the second end plate 2 also on the core-side edge portion 2a-side, as well as on the no core-side edge portion 2b-side, a vertical component (axial direction component) of a pressing force C applied to the deformed portion 3e on the no core-side edge portion 2b-side is canceled. This makes it possible to prevent an outer edge 2d of the second end plate 2 from being lifted. As a result, it is possible to suppress creation of a gap between the core 4 and the second end plate 2 at the outer edge 2d, thereby suppressing reduction of torque of the electric motor rotor. Further, because the deformed portion 3e is deformed to fit the shape of the inner edge of the second end plate 2 on the core-side edge portion 2a-side, as well as on the no core-side edge portion 2b-side, it is avoided that the core 4 is pressed excessively strongly by the second end plate 2 only from the no core-side edge portion 2b, and further, it is possible to suppress breakage of the magnets 7 in the core 4.

Further, by rotating the mandrels 1, each having a shape for the deformation process that fits the shape of the inner edge of the second end plate 2, about the rotation axis L while increasing the distance between the mandrels 1 in the radial direction X, it is possible to uniformly deform the entire circumference of the deformed portion 3e so as to fit the second end plate 2, and further, to deform the deformed portion 3e so as to fit the second end plate 2 reliably and firmly. Moreover, because the deformed portion 3e is gradually deformed to fit the inner edge of the second end plate 2, it is possible to reduce inner distortion and residual stress of the deformed portion 3e. This makes it possible to improve durability of the electric motor rotor. Further, a flat plate can be used as the second end plate 2, and therefore, it is possible to reduce manufacturing costs because the flat plate is easy to manufacture.

Figure 6:
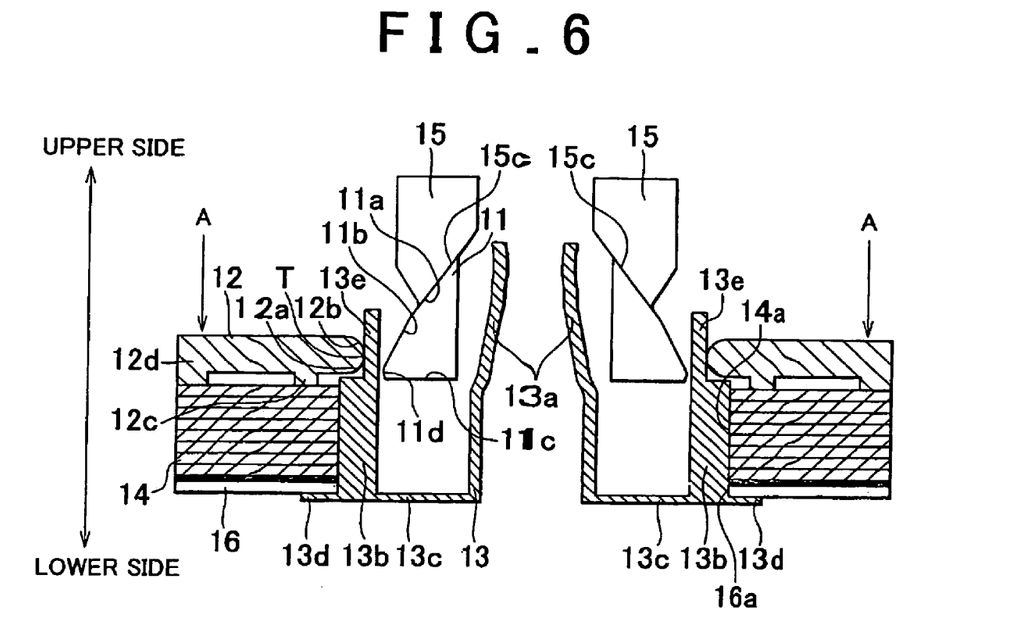
FIG. 6 is a longitudinal cross-section showing the state where a first deforming punch is moved to a deformation position, according to a second embodiment of the invention.

FIGS. 6 to 9 show a manufacturing method of the electric motor rotor according to a second embodiment of the invention. The constituent components of the electric motor rotor shown in FIGS. 6 to 9 are identical with or equivalent to those shown in FIGS. 2 and 5 of the first embodiment, and therefore, the description thereof will be omitted in the description of the second embodiment. As shown in FIG. 6, before deforming a deformed portion 13e, a first deforming punch 11 and a second deforming punch 15 are inserted into the shaft 13 by elevating means in a manner such that the first deforming punch 11 and the second deforming punch 15 do not contact the outer shaft portion 13b and the inner shaft portion 13a. The vertical level of the first deforming punch 11 is set so that a pressing surface 11d is inserted between a core-side edge portion 12a of an inner edge of a second end plate 12 and the core 4.

As shown in FIG. 6, the longitudinal cross-sectional configuration of the first deforming punch 11 is shaped as a substantially right triangle. The edge of the pressing surface 11d of the first deforming punch 11 that presses the deformed portion 13e is rounded. An oblique side of the first deforming punch 11 includes an upper oblique side 11a and a lower oblique side 11b. An oblique angle of the upper oblique side 11a is smaller than that of the lower oblique side 11b. Thus, a cross-sectional configuration of the second deforming punch 15 is substantially a pentagon. An oblique angle of an oblique side 15c of the second deforming punch 15 is identical with the oblique angle of the upper oblique side 11a of the first deforming punch 11. The oblique side 15c of the second deforming punch 15 abuts the upper oblique side 11a of the first deforming punch 11. The first deforming punch 11 and the second deforming punch 15 are held by diameter increasing means (not shown) so as to be movable in the radial direction. Further, the first deforming punch 11 and the second deforming punch 15 are held by elevating means (not shown) so as to be vertically movable in the direction toward the shaft 13. As shown in a plan view in FIG. 9, four first deforming punches 11 are arranged in a circle, and four second deforming punches 15 are also arranged in a circle, when viewed from above. Gaps are provided between the respective adjacent ones of the first deforming punches 11 and between the respective adjacent ones of the second deforming punches 15, because it is necessary to reduce the diameter in order to pull out the first deforming punches 11 and the second deforming punches 15 after the deformation process is finished. If the gap is too large, the area used for pressing the deformed portion 13e is reduced. Therefore, the gap is minimized.

Figure 7:
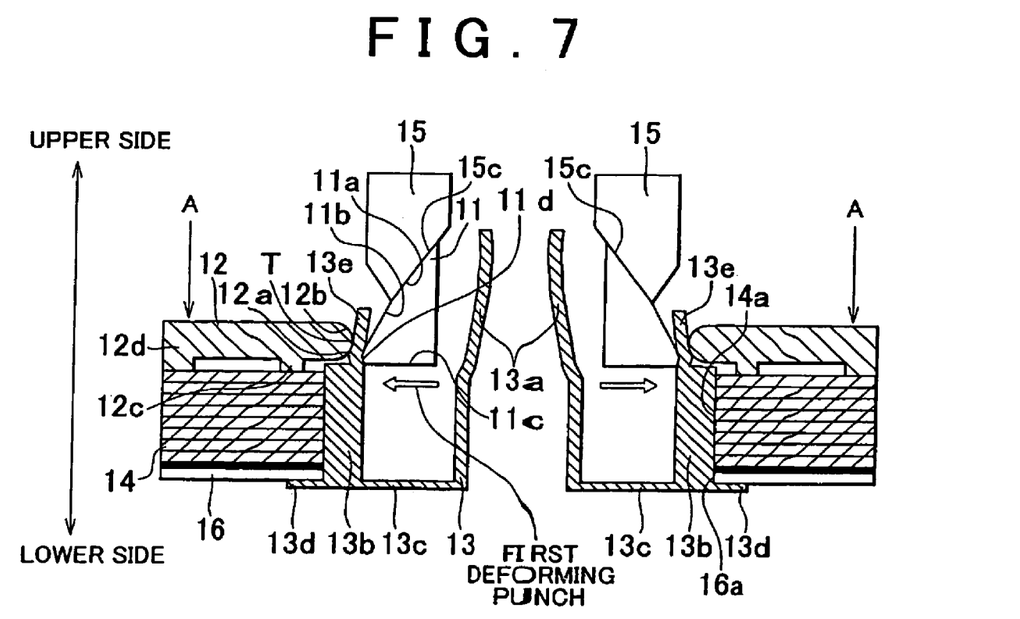
FIG. 7 is a longitudinal cross-section showing a first process of the second embodiment of the invention.

FIG. 7 shows a first process of the second embodiment. The first deforming punches 11 and the second deforming punches 15 are moved outward in the radial direction by the diameter increasing means from the state shown in FIG. 6 into the state shown in FIG. 7. When the first deforming punches 11 and the second deforming punches 15 are moved radially outward so that diameters of the circles formed by the first processing punches 11 and the second processing punches 15 are increased, pressing surfaces 11a press the deformed portion 13e to deform the deformed portion 13e to fit the core-side edge portion 12a of the second end plate 12. The diameter increasing means applies the pressing force of sufficient magnitude to the first deforming punches 11 and the second deforming punches 15 so as to perform the deformation process.

Figure 8:
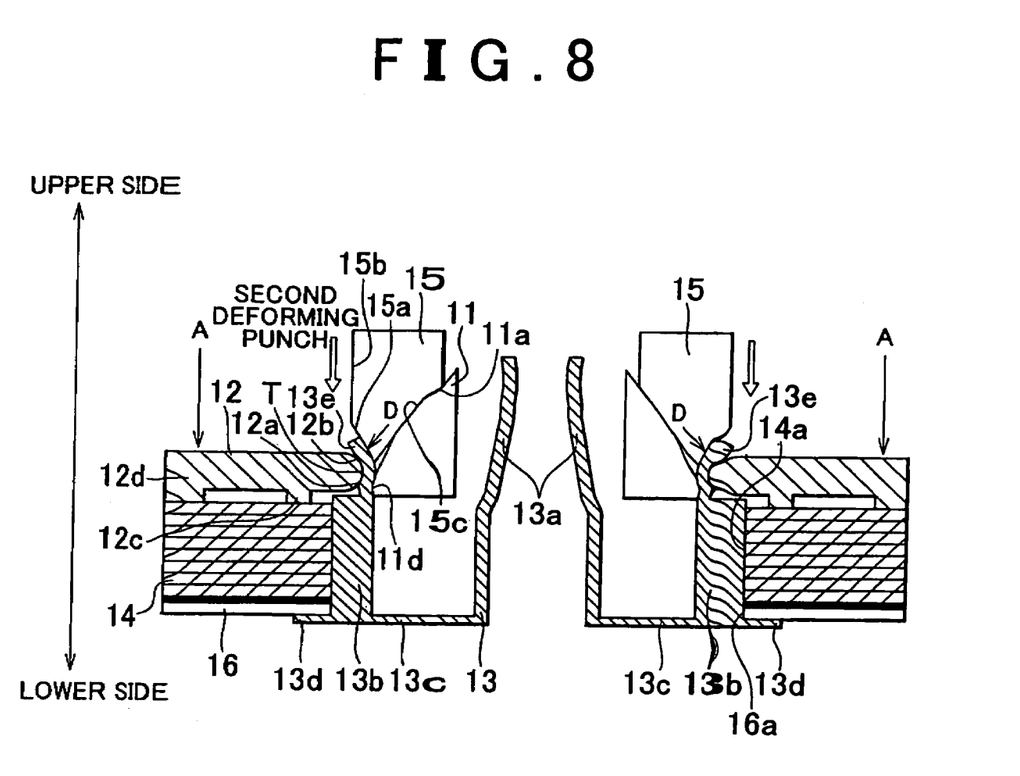
FIG. 8 is a longitudinal cross-section showing a second process of the second embodiment of the invention.
Figure 9:
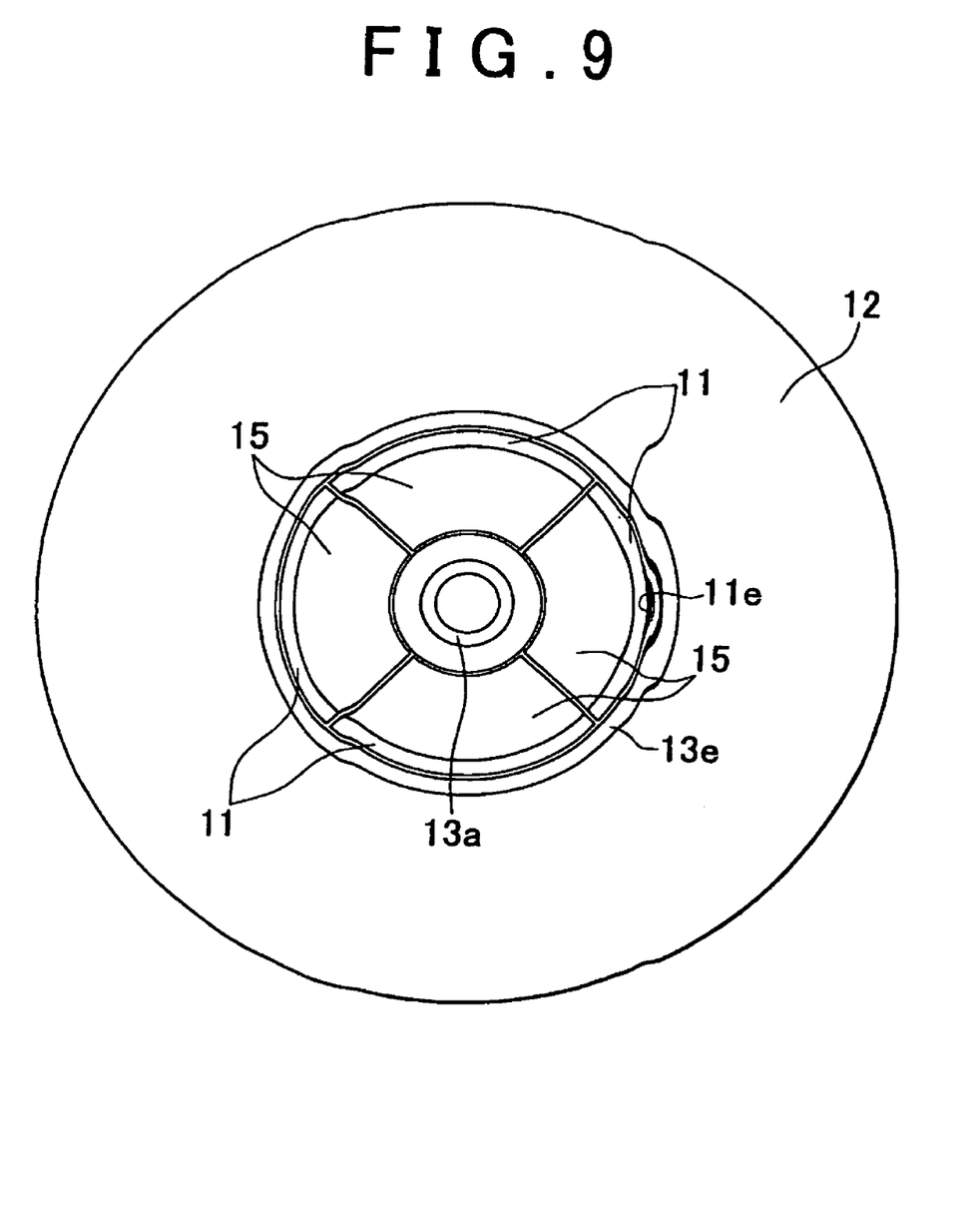
FIG. 9 is a plan view showing a state where the first deforming punch is moved to the deformation position, according to the second embodiment of the invention.

FIG. 8 shows a second process of the second embodiment. The diameter increasing means moves the second deforming punches 15 to slide on the upper oblique side 11a of the corresponding first deforming punch 15 in a direction D, which is diagonally downward, in a state where each of the first deforming punches 11 shown in FIG. 7 presses the core-side edge portion 12a of the inner edge of the second end plate 12 (the position of the first deforming punch 11 in this process will be referred to as "deformation position"). In this way, because a pressing force acts on the deformed portion 13e in the direction D, that is, diagonally downward (this pressing force will be hereinafter referred to as "pressing force D"), the second deforming portions 15 press and deform the deformed portion 13e. The upper oblique side 11a of each of the first deforming punch 11 serves as a guide for the corresponding second processing punch 15, and therefore, it is possible to reliably and firmly deform the deformed portion 13e to fit the no core-side edge portion 12b of the inner edge of the second end plate 12. In this configuration, there is no need to use a separate guide for the second deforming punches 15.

Further, according to the invention, after the first process in which the first deforming punches 11 deform the deformed portion 13e so as to fit the core-side edge portion 12a of the inner edge of the second end plate 12, the second process is performed in which the second deforming punches 15 deform the deformed portion 13e so as to fit the no core-side edge portion 12b of the inner edge of the second end plate 12 while maintaining the first deforming punches 11 at the deformation positions. This makes it possible for the first deforming punches 11 to receive a vertical component of the pressing force D that presses the deformed portion 13e against the no core-side edge portion 12b of the inner edge of the second end plate 12. Therefore, it is possible to suppress excessive pressing of an inner portion 12c of the second end plate 12, and further, it is possible to prevent an outer edge 12d of the second end plate 12 from being lifted. As a result, it is possible to suppress creation of a gap between the outer edge 12d of the second end plate 12 and the core 14, thereby suppressing reduction of the torque of the electric motor rotor.

After finishing the deformation process in which the deformed portion 13e is deformed to fit the core-side edge portion 12a and the no core-side edge portion 12b of the inner edge of the second end plate 12 by the first deforming punches 11 and the second deforming punches 15, respectively, the second deforming punches 15 are brought back to the original positions above the respective first deforming punches 11 by the diameter increasing means, and then, the first deforming punches 11 are moved inward in the radial direction by the diameter increasing means. Then, the first deforming punches 11 and the second deforming punches 15 are pulled up by the elevating means from inside the shaft 13, whereby the deformation process for the electric motor rotor is finished.

As described above, in the manufacturing method of the electric motor rotor in which the shaft 13 is inserted through the center hole 14a of the core 14 formed of the stacked steel plates, each having the center hole 14a, and the deformed portion 13e of the shaft 13 is deformed to fit the second end plate 12 while the second end plate 12 is pressed against the core 4, the electric motor rotor is manufactured by deforming, on the core-side edge portion 12a-side and the no core-side portion 12b-side of the second end plate 12, the deformed portion 13e of the shaft 13 that engages with the inner edge of the second end plate 12, and deforming the deformed portion 13e in to the deformed shape that fits the shape of the inner edge of the second end plate 12. Because the deformed portion 13e is deformed to fit the inner edge of the second end plate 12 also on the core-side edge portion 12a-side, as well as on the no core-side edge portion 12b-side, the first deforming punches 11 receive the vertical component (axial direction component) of the pressing force D applied to the deformed portion 13e against the no core-side edge portion 12b of the second end plate 12. This makes it possible to prevent an outer edge 12d of the second end plate 12 from being lifted. As a result, it is possible to suppress creation of a gap between the outer edge 12d of the second end plate 12 and the core 14, thereby suppressing reduction of the torque of the electric motor rotor.

Further, because the deformed portion 13e is deformed to fit the shape of the inner edge of the second end plate 12 on the core-side edge portion 12a-side, as well as on the no core-side edge portion 12b-side, it is avoided that the core 14 is pressed excessively strongly by the second end plate 12 only from the no core-side edge portion 12b, and further, it is possible to suppress breakage of the magnets 7 in the core 14. Further, it is possible to simplify the apparatus for manufacturing the electric motor rotor.

It should be noted that the invention is not limited to the embodiments as described above, and may be embodied in various modifications within a scope of the invention. In the embodiments as described above, the cross section of the inner edge of the second end plate is rounded. However, the inner edge of the second end plate may have a substantially triangle cross-section. This makes the deformation process easier. Further, with regard to the first embodiment, instead of rotating the mandrels 1, the electric motor rotor may be rotated in manufacturing the electric motor rotor.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A manufacturing method of a rotor for an electric motor including a core formed of stacked steel plates, each of which has a center hole, and a shaft inserted through the center hole of the core, in which method the shaft is deformed to fit an end plate in a state where the end plate is pressed against the core, the manufacturing method comprising deforming a deformed portion of the shaft that engages with an edge of the end plate, along a core-side edge portion and a no core-side edge portion of the edge of the end plate with respect to a thickness direction of the edge of the end plate to cause the deformed portion to be in the same shape as a shape of the edge of the end plate,
    wherein the shape of the deformed portion on the core side in the thickness direction of the edge of the end plate is such that the deformed portion fits in between the end plate and the core, so that a load in a direction of the core that occurs when the deformed portion is deformed on the no core side in the thickness direction of the edge of the end plate is received.

2. The manufacturing method according to claim 1, wherein a deformation process is performed using a mandrel that includes a portion formed along the shape of the edge of the end plate by increasing a diameter of the mandrel in a direction of a circumference while rotating the mandrel relative to the shaft.

3. A manufacturing method of a rotor for an electric motor including a core formed of stacked steel plates, each of which has a center hole, and a shaft inserted through the center hole of the core, in which method the shaft is deformed to fit an end plate in a state where the end plate is pressed against the core, wherein:
    a deformed portion of the shaft that engages with an edge of the end plate is deformed along a core-side edge portion and a no core-side edge portion of the edge of the end plate with respect to a thickness direction of the edge of the end plate so that the deformed portion is formed into the same shape as the shape of the edge of the end plate;
    a first deforming punch for deforming the deformed portion so as to fit the core-side edge portion of the edge of the end plate, which is a portion of the edge on a core side with respect to an innermost position of the edge of the end plate, and a second deforming punch for deforming the deformed portion to fit the no core-side edge portion of the end plate, which is a portion on a side opposite to the core side with respect to the innermost position of the edge of the end plate, are used; and
    the manufacturing method includes:
    a first step of deforming the core-side edge portion with respect to the thickness direction of the edge of the end plate by the first deforming punch: and
    a second step of deforming the no core-side edge portion with respect to the thickness direction of the edge of the end plate by the second deforming punch while the first deforming punch is positioned at a deformation position.

4. A rotor for an electric motor including a core formed of stacked steel plates, each of which includes a center hole, and a shaft inserted into the center hole, in which rotor the shaft is deformed to fit an end plate in a state where the end plate is pressed against the core, wherein:
    a deformed portion of the shaft that engages with an edge of the end plate is deformed along a core-side edge portion and a no core-side edge portion of the edge of the end plate with respect to a thickness direction of the edge of the end plate to cause the deformed portion to be in the same shape as a shape of the edge of the end plate; and
    wherein the shape of the deformed portion on the core side in the thickness direction of the edge of the end plate is such that the deformed portion fits in between the end plate and the core, so that a load in a direction of the core that occurs when the deformed portion is deformed on a no core side in the thickness direction of the edge of the end plate is received.

* * * * *